United States Patent
Gans et al.

[11] Patent Number: 6,053,527
[45] Date of Patent: Apr. 25, 2000

[54] AIRBAG SYSTEM WITH SERVICEABLE TETHERED COVER

[75] Inventors: Russell S. Gans, Westland, Mich.; Michael J. Ravenberg, Corinne; Terry R. Davis, Layton, both of Utah; Patrick G. Jarboe, Shelby Twp., Mich.

[73] Assignee: Autoliv ASP, Inc., Ogden, Utah

[21] Appl. No.: 08/286,795

[22] Filed: Aug. 5, 1994

[51] Int. Cl.[7] .................................................. B60R 21/16
[52] U.S. Cl. ..................................... 280/728.3; 280/728.1
[58] Field of Search ........................... 280/728 B, 728 R, 280/731, 732, 743 A; 24/625, 614, 615, 453

[56] References Cited

U.S. PATENT DOCUMENTS

| | | | |
|---|---|---|---|
| 2,099,655 | 11/1937 | McFadden | 24/625 |
| 3,822,894 | 7/1974 | Muller et al. . | |
| 3,944,250 | 3/1976 | Wulf et al. . | |
| 4,893,833 | 1/1990 | DiSalvo et al. . | |
| 4,911,471 | 3/1990 | Hirabayashi . | |
| 4,964,653 | 10/1990 | Parker . | |
| 5,031,930 | 7/1991 | Sato . | |
| 5,044,663 | 9/1991 | Seizert | 280/743 A |
| 5,064,217 | 11/1991 | Shiraki . | |
| 5,072,967 | 12/1991 | Batchelder et al. . | |
| 5,082,310 | 1/1992 | Bauer . | |
| 5,096,221 | 3/1992 | Combs et al. . | |
| 5,150,919 | 9/1992 | Sakakida et al. . | |
| 5,195,776 | 3/1993 | Sakakida et al. . | |
| 5,199,739 | 4/1993 | Fujiwara et al. . | |
| 5,211,421 | 5/1993 | Catron et al. . | |
| 5,211,422 | 5/1993 | Frantz et al. . | |
| 5,219,177 | 6/1993 | Wang . | |
| 5,242,191 | 9/1993 | Faigle et al. . | |
| 5,332,257 | 7/1994 | Rogers et al. | 280/728 B |
| 5,398,960 | 3/1995 | Ravenberg et al. | 280/732 |

FOREIGN PATENT DOCUMENTS

| | | |
|---|---|---|
| 415362A2 | 9/1990 | European Pat. Off. . |
| 3843686A1 | 6/1990 | Germany . |
| 4310450 | 11/1992 | Japan .................. 280/728 B |
| 5338513 | 12/1993 | Japan .................. 280/728 B |
| 2218698 | 1/1989 | United Kingdom . |

Primary Examiner—Eric Culbreth
Attorney, Agent, or Firm—Sally J. Brown

[57] ABSTRACT

An airbag system for motor vehicles wherein the airbag mechanism is concealed behind a cover provided on the instrument panel. A tether is provided to restrain the cover from uncontrolled movement during deployment of the airbag. One end of the tether is fixed to either the airbag housing or to a fixed portion of the instrument panel, while the other end of the tether is detachably mounted to the cover. The detachable feature of the attachment means permits the cover to be easily removed for repair, inspection or replacement without the need to disturb the airbag or its housing.

14 Claims, 5 Drawing Sheets

AIRBAG SYSTEM WITH SERVICEABLE TETHERED COVER

BACKGROUND OF THE INVENTION

1. Field of the Invention

The present invention relates to a serivceable, tethered cover, airbag system and more particularly to a motor vehicle airbag system employing a cover with a flexible tether detachably interconnected thereto to facilitate repair or replacement of the cover when desired. In airbag cushioning devices used in motor vehicles, it is desirable to restrain and limit the amount of travel or movement of a cover or door away from a panel opening during airbag deployment. The cover or door normally closes an opening in a panel or a steering wheel. It is also desirable to prevent a cover or door from fracturing into pieces or fragments upon airbag deployment. Moreover, because an airbag cover commonly provides a portion of a panel or steering wheel surface in a passenger compartment of a vehicle, the cover can become defective, damaged or unsightly and it is desirable to replace or repair the cover without requiring disturbance of other components of the airbag system.

2. Background of the Prior Art

U.S. Pat. No. 3,822,894 to Muller et al. discloses a steering wheel having a built-in air cushion employing a strong hinge between a cover and a dish containing the airbag so that on inflation, the cover is pushed away but not completely liberated from attachment to the steering wheel.

The Wulf et al., U.S. Pat. No. 3,944,250, discloses an automatically inflatable gas cushion for the protection of passengers in vehicles employing a cover which is opened upon inflation of the airbag or gas cushion and which is retained by a flexible band so that the cover is restrained after opening.

The DiSalvo et al., U.S. Pat. No. 4,893,833, discloses a closure for an airbag deployment opening wherein an integral aluminum hinge flange on the closure is bolted to the frame of the vehicle permitting pivotal opening movement of the closure.

The Hirabayashi, U.S. Pat. No. 4,911,471, discloses an arrangement of an airbag device in a motor vehicle wherein angular pivotal movement of a door over the airbag is restricted by a strap to limit the angular degree of opening when the airbag is inflated.

U.S. Pat. No. 4,964,653 to Parker discloses a self-skinned foam closure element for an inflatable restraint door assembly having a combination hinge and tether for restraining travel of the closure element during airbag deployment.

U.S. Pat. No. 5,064,217 to Shiracki discloses a cover for an airbag unit having "Nylon" yarn bands molded in place and wrapped around a retaining band of resin provided on the airbag enclosure or housing.

U.S. Pat. No. 5,150,919 to Sakakida et al. discloses an airbag system for a vehicle having a pair of doors or lids which pivotally open in opposite direction and which are restrained by belt members so that the lids pivot about transverse axes and open smoothly upon airbag deployment.

U.S. Pat. No. 5,195,776 to Sakakida et al. discloses an airbag installation having curved airbag cover lids which are reliably opened by rotation about a center point so as not to restrict the inflation of the airbag.

U.S. Pat. No. 5,072,967 to Batchelder et al. discloses an instrument panel having an invisible airbag deployment door with weakened sections formed therein but hidden from view for facilitating fracture of the door along predetermined lines for opening movement during airbag deployment.

The Combs et al., U.S. Pat. No. 5,096,221, discloses an airbag door having plural substrates on the inside which normally retain the door in a closed position and at least one of which is notched or provided with a hidden tear seam to facilitate fracture for opening of the door.

The Catron et al., U.S. Pat. No. 5,211,421, discloses an airbag cover door retainer having bifurcated engagement flanges on the door normally retaining the door in a closed position and releasable to permit door opening during airbag deployment.

The Fujiwara et al., U.S. Pat. No. 5,199,739, discloses an airbag cover opening mechanism for a motor vehicle including a sheer pin which is severed upon opening pressure exerted on the inside of the door by the deploying airbag.

The Wang, U.S. Pat. No. 5,219,177, discloses a releasable latch for an airbag deployment door which is activated by airbag deployment to permit the door to open.

U.S. Pat. No. to Faigle et al. No. 5,242,191, discloses a tethered airbag cover system wherein the cover is retained after opening attached to the airbag itself.

European Patent Application No. EPO 0415 362 A2 discloses an airbag supporting system having two fly-away covers restrained by loose flexible straps.

German Patent No. DE 38 43 686 A1 discloses an airbag cover for a car which is retained in one piece in relation to the dashboard of the automobile by a retaining hinge element.

OBJECTS OF THE INVENTION

Accordingly, it is an object of the present invention to provide a new and improved tethered cover airbag system for motor vehicles and the like and more particularly, to provide an airbag system having a serviceable cover for normally protecting the airbag but bodily movable to permit the bag to deploy outwardly when desired to protect an occupant of the vehicle.

It is another object of the present invention to provide an airbag system of the character described having a flexible tether detachably connected between the cover and a panel of the vehicle or airbag housing in the vehicle so that the amount of movement of the cover away from the closed position is limited or restrained.

Yet another object of the present invention is to provide a new and improved tethered cover for an airbag system wherein load spreading means is provided for attaching the tether to the cover so that the cover does not fracture or break apart during deployment of the airbag.

Another object of the present invention is to provide a new and improved airbag system having a tethered cover which normally limits the amount of travel of the cover away from the panel of the vehicle when the airbag is deployed.

Still another important object of the present invention is to provide a new and improved airbag system of the character described wherein a cover can be disconnected and reconnected to a tether with minimal disturbance of the airbag system so that replacement and repair of a damaged, defective or unsightly cover can be rapidly and easily accomplished.

BRIEF SUMMARY OF THE PRESENT INVENTION

The foregoing and other objects and advantages of the present invention are accomplished in a new and improved airbag system for motor vehicles and the like having a panel formed with an opening in the vicinity of an occupant's seat. An inflatable airbag is contained within a housing in a deflated condition and the housing is aligned with a panel opening to permit the airbag to pass outwardly when deployed to provide cushioning support for an occupant of the seat during an emergency. A serviceable cover is provided for normally closing the panel opening to protect the airbag assembly and is movable bodily away from the opening during airbag deployment. In order to prevent the cover or portions thereof from moving about the vehicle in an uncontrolled manner, a flexible tether is detachably interconnected between the cover and the panel or the housing of the airbag assembly for positively limiting the distance of travel of the cover during airbag deployment. A load spreading, detachable connector is provided between the cover and the tether so that stress exerted by the tether on the cover during opening deployment of the airbag is spread over a relatively large area on the cover, thus reducing the possibility that the cover will fracture or break up, yet still positively retaining the cover a limited distance away from the panel opening. The detachable connector is operable to disconnect and reconnect a cover with the tether so that a damaged, defective or unsightly cover can be repaired and/or replaced with minimal disturbance of the components of the airbag system, and when the cover is detached servicing of the airbag components internally of the cover can be accomplished and thereafter the original cover or a replacement can be readily reattached to the tether and positioned in place to close the panel opening.

BRIEF DESCRIPTION OF THE DRAWINGS

For a better understanding of the present invention, reference should be had to the following detailed description taken in conjunction with the drawings, in which.

DETAILED DESCRIPTION OF A PREFERRED EMBODIMENT OF THE INVENTION

Figure 1:
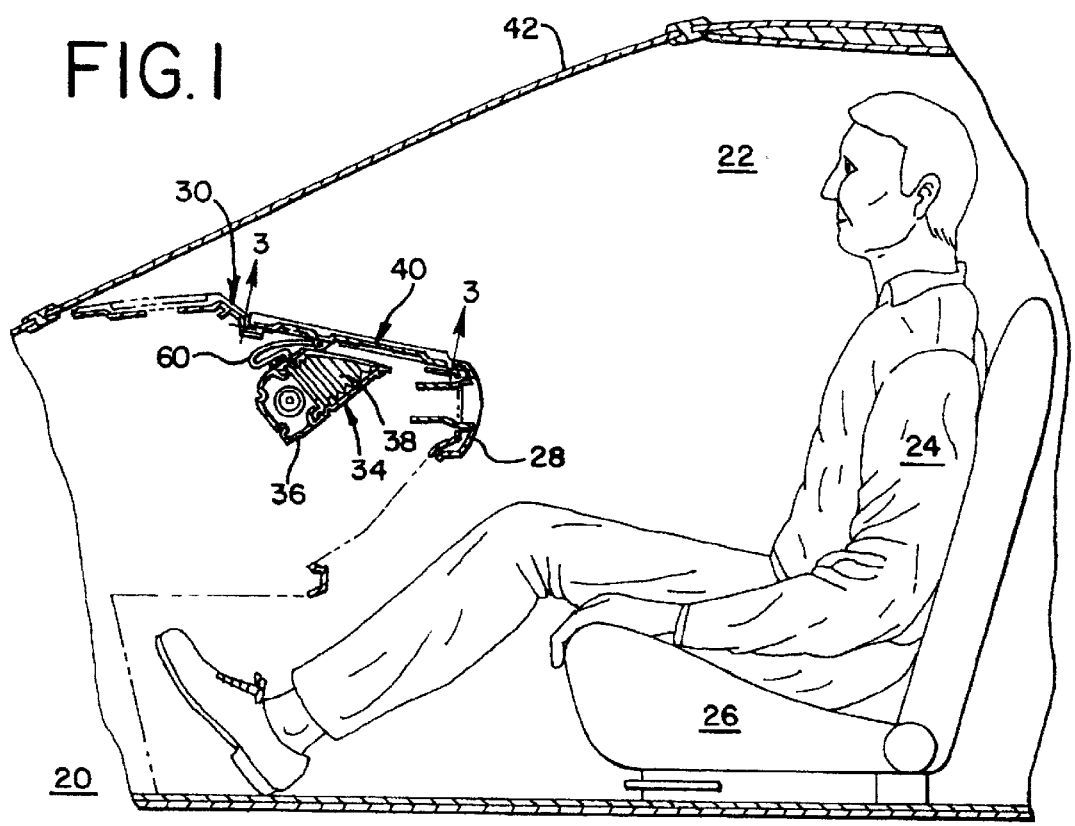
FIG. 1 is a longitudinal cross-sectional view of a motor vehicle illustrating a serviceable, tethered cover airbag system in accordance with the present invention and shown with the cover in a closed position over a panel opening while the airbag is in deflated condition.
Figure 2:
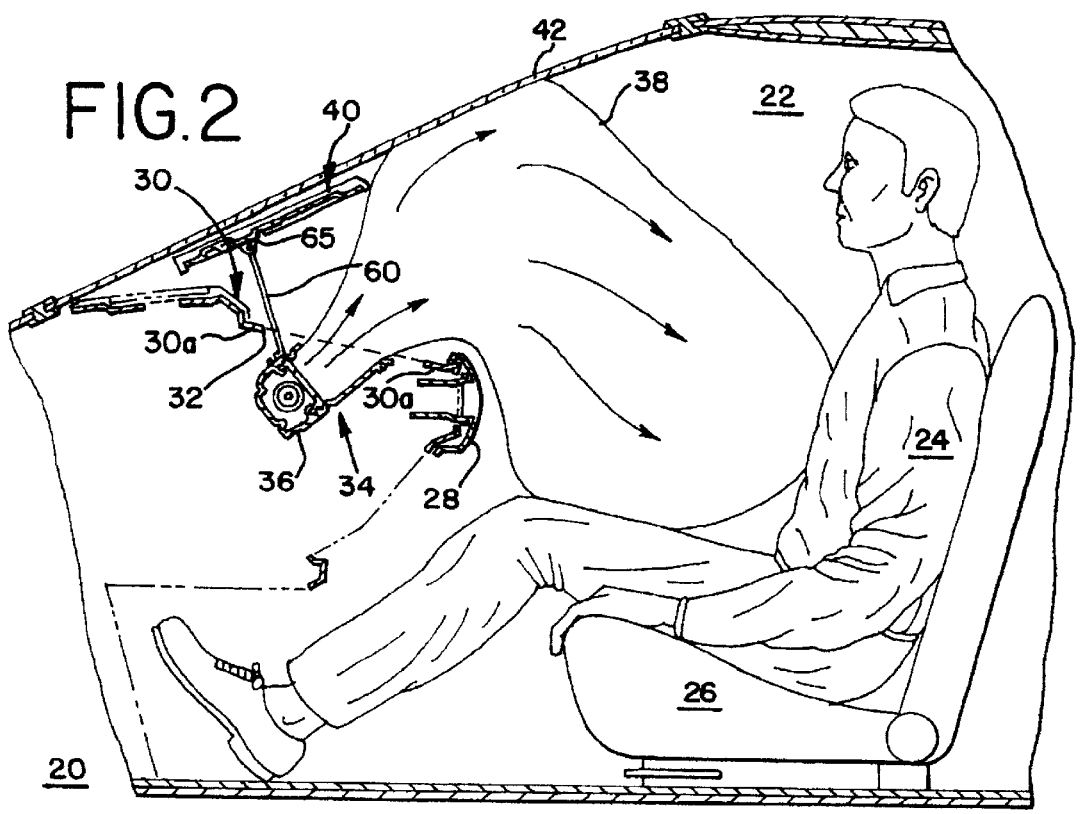
FIG. 2 is a longitudinal cross-sectional view similar to FIG. 1 illustrating in animated fashion emergency deployment of the airbag with the cover in an open position while tethered so as to be positively retained a limited distance away from the panel opening.

Referring now more particularly to the drawings, in FIGS. 1–4 is illustrated a motor vehicle 20 having a passenger compartment 22 for accommodating a person 24 in seated position on a vehicle seat 26. Forward of the occupant 24, the vehicle 20 includes a dashboard 28 and a panel 30 having an enlarged opening 32 spaced directly above an airbag and inflator assembly generally indicated by the reference numeral 34. The airbag and inflator assembly 34 includes a housing or canister 36 fixedly mounted in place beneath the panel 30 and the opening 32. An airbag 38 in deflated condition is stored and contained within the housing 36 until deployed as illustrated in FIG. 2 to protect the vehicle occupant 24 from injury in an accident.

Figure 4:
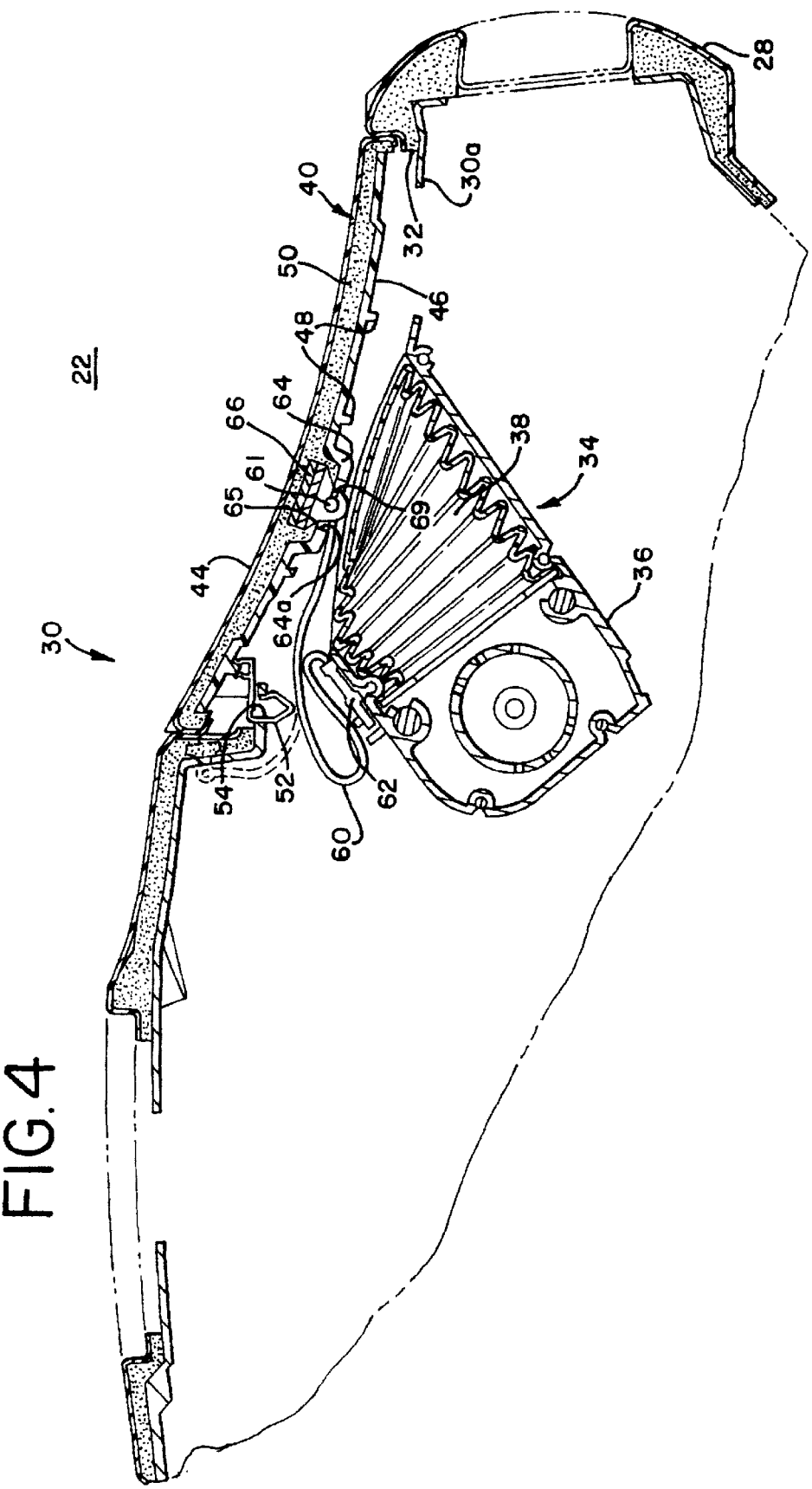
FIG. 4 is an enlarged, fragmentary cross-sectional view similar to that of FIG. 1 showing the cover in a closed position covering the panel opening with the airbag in a deflated, stored condition ready for deployment.

The panel opening 32 is normally closed by a movable cover 40, which as shown in FIGS. 1 and 4 forms part of the upper surface of the panel 30 above the opening 32. When the airbag 38 is inflated during a crash or emergency and expands outwardly, the cover 40 is rapidly moved away from the panel opening 32 permitting the expanding airbag to rapidly inflate as shown in FIG. 2. When airbag deployment occurs, the cover 40 if otherwise unrestrained or untethered could bounce off a windshield 42 or other interior surface in passenger compartment 22.

Referring to FIG. 4, the cover 40 includes an outer skin 44 formed of molded resinous plastic material and an inner skin 46 also formed of relatively thick resinous plastic material to provide strength and integrity for the cover 40 overall so that break up or fracture of the cover into pieces does not occur upon airbag deployment.

Figure 3:
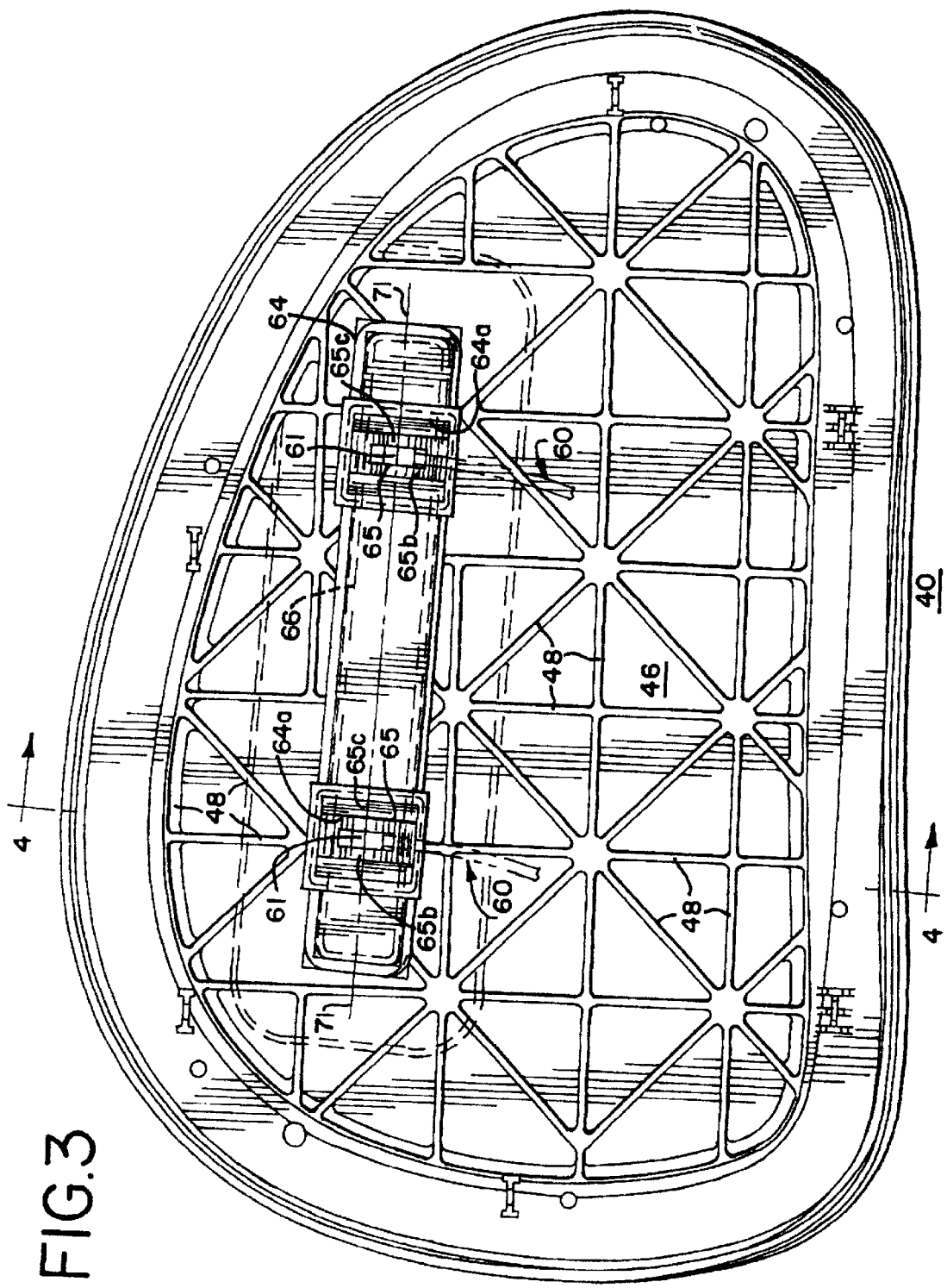
FIG. 3 is an underside view of a cover in accordance with the features of the present invention.

As can be seen from FIGS. 3 and 4, a number of integral ribs 48 are molded into the inner skin 46 for stiffening purposes and a layer of foam 50 is bonded between the inner and outer skins 46 and 44, respectively, of the cover 40 to provide a strong and lightweight body. Normally the cover 40 is retained in a closed position (FIG. 1) directly above and over the opening 32 by a plurality of pins or spring latch elements 52 which are locked into openings 54 (FIG. 4) provided in a lower flange 30a of the panel 30, around the edge of the opening 32. Until the airbag 38 is deployed, the cover 40 acts as an integrated part of the panel 30 and at the same time protects the airbag assembly 34 from damage and limits access thereto.

In accordance with the present invention, one or more tethers of strong, flexible material such as a stranded metal cable 60, "Nylon" webbing, seat belt type material or the like is interconnected between the underside of the cover 40 and either the housing or canister 36 of the airbag inflator assembly 34 or, as schematically shown, panel 30. Inner ends of the flexible cable tethers 60 are interconnected to the upper sidewall of the housing or canister 36 by means of metal or plastic clips 62 (FIGS. 4 and 6).

Figure 5:
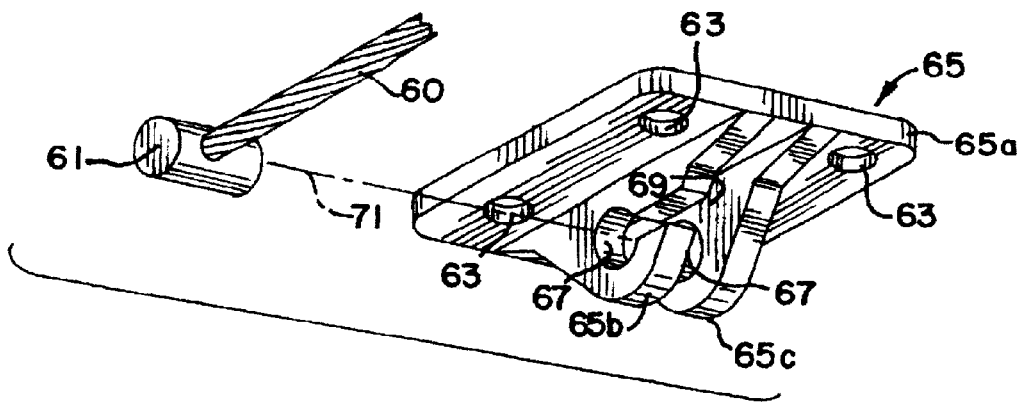
FIG. 5 is a perspective, animated view of a detachable connector for a cover and tether combination shown in a disconnected condition as used for permitting the cover to be detached from the tether for servicing of the system and/or repair and replacement of the cover.

Referring now specifically to FIGS. 3 and 4, the inner skin 46 of the cover 40 is formed with an elongated, generally rectangular compartment 64 therein in order to accommodate a stiffening bar 66 formed of metal or other suitable stiff and strong material such as resinous plastic. As best shown in FIGS. 5 and 6, an outer end of each cable tether 60 is provided with a swaged on, cylindrical cross-pin 61 of short length adapted to be detachably interconnected to a clevis type, connector 65 having a relatively large base 65a of square or rectangular shape secured to the lower face of the stiffening bar 66 with appropriate fasteners such as headed rivets or bolts (not shown) extended through aligned holes 63 in the base 65a and the bar 66.

Figure 6:
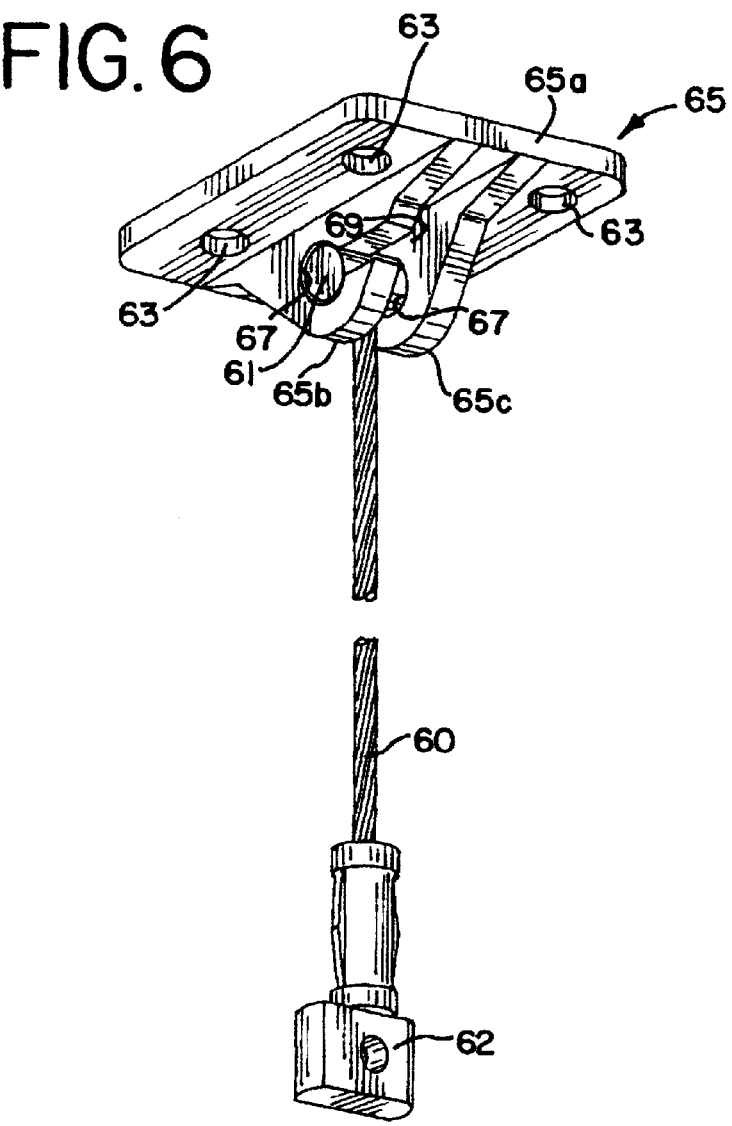
FIG. 6 is a view illustrating the connector and tether combination of FIG. 5 with the tether and cover interconnected together.

In accordance with the present invention, the clevis type connectors 65 include a pair of spaced apart, parallel, integrally formed, depending flanges 65b and 65c of generally triangular shape as best shown in FIGS. 5 and 6. Each flange 65b and 65c is formed with a circular opening 67 adjacent the central portion thereof having a diameter slightly larger than that of the cross-pin 61 on the cable tether 60. The openings 67 in each pair of facing flanges 65b and 65c are in coaxial alignment to provide bearing support surfaces for opposite end portions of the cross-pins 61 when inserted in place as shown in FIG. 6.

The base 65a and flanges 65b and 65c of each connector 65 are preferably formed of strong lightweight metal in a casting operation and inside faces of the flanges are spaced apart by a distance slightly greater than the diameter of the cable tether 60 to accommodate the cable between the flanges when interconnected as shown in FIG. 6. In order to permit the cable tethers 60 to be detachably connected to the connectors 65 for easy interconnection and disconnection when required, the flange 65b is formed with a slot 69 having an open mouth at the outer end on the edge of the flange. The open mouth of the slot 69 is wide enough to accommodate the diameter of the cable tether 60 when the tether is inserted into the slot from outside the flange and moved in a direction coaxial with the cross-pin along the centerline 71 of the circular openings 67.

An inner end of each slot 69 opens into the circular opening 67 of the flange 65b and once a cable tether 60 is inserted into the space between the flanges 65b and 65c, the cable tether is rotated downwardly to the position of FIG. 6 about the axis 71 so that the facing inside surfaces of the flanges 65b and 65c retain the cross-pins 61 from axial movement with opposite ends of cross-pin journalled in the cylindrical opening 67 of the flanges.

As illustrated in FIG. 4, the connectors 65 are attached to the stiffener bar 66 with the open mouth of the slots 69 facing toward the passenger or occupant 24 and the cable tethers 60 extend in an opposite direction toward the forward end of the vehicle as shown in FIGS. 1, 2 and 4. When it is desired to service components of the airbag system 34 below the cover 40 or when it is desired to remove and replace or repair a defective, damaged or unsightly cover 40, the cover 40 is withdrawn upwardly from the opening 32 in the panel 30 to expose the flanges 65b and 65c of the connectors 65 which project downwardly through slots 64a provided in the bottom wall of the compartment 64 formed in the inner skin or wall 46 of the cover 40. When the flanges 65b and 65c are thus exposed, the cable tethers 60 are rotated in a counter-clockwise direction (FIG. 4) until aligned with the slots 69 in the flanges 65a and the cables and cross-pins 61 are displaced along the axis 71 until free and clear of the flanges 65b and 65c, at which time a disconnection between the cover 40 and the cable tethers 60 is completed.

The formed housing 64 in the inner skin 46 of the cover is provided with the slots 64a in the bottom wall at appropriate intervals along the length thereof to accommodate the number of connectors 65 and cable tethers 60 that are used in a particular system. When the airbag 38 is deployed and the cover 40 is ejected away from the opening 32 in the panel 30, the force exerted by the cable tethers 60 while in a taut condition (FIG. 2) is spread from the bases 65a of the connectors 65 to the stiffening bar 66 which are over a substantial portion of the length of the cover 40. This attachment arrangement greatly reduces the stress exerted by each cable tether 60 on the cover 40 during deployment of the airbag 38 and normally prevents fracture of the cover 40 into pieces or fragments which could become projectiles causing damage or injury.

It should also be noted that the number of cable tethers 60 required for a particular panel 60 may be increased if needed. For an exceptionally long cover, 40 three rather than two tethers may be provided or the number of tethers may be decreased to one in some instances. In any case, the bases 65a of the connector 65 transmit and spread the load to the stiffening bar 66 which is positively contained between the inside wall or skin 46 and the outside wall or skin 44 in the foam 50 of cover 40.

Figure 7:
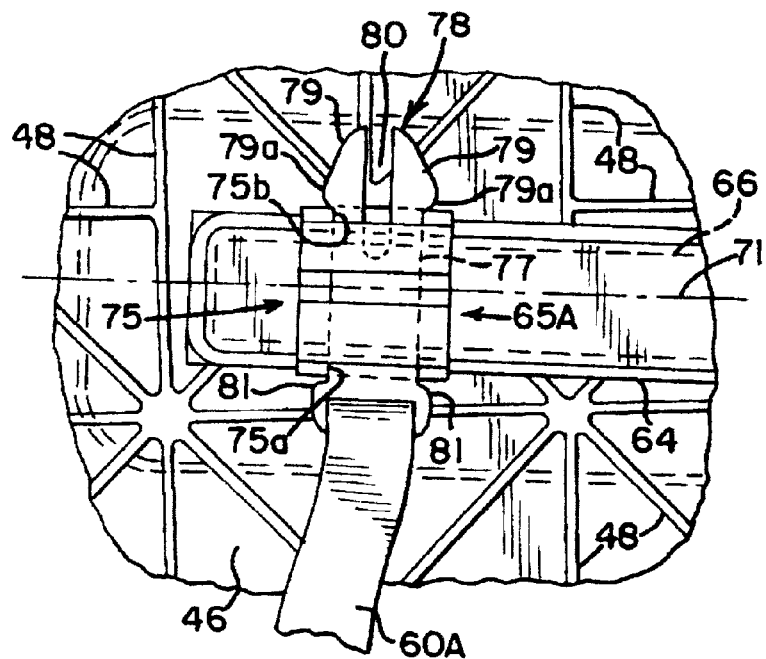
FIG. 7 is a view of a portion of the underside of a tether and cover combination utilizing another embodiment of a detachable connector therebetween.

Referring now to FIG. 7, therein is illustrated an alternate embodiment of a detachable connector 65A for use with a tether 60A formed of flexible webbing of "Nylon" plastic stranded material. The detachable connector 65A includes a generally rectangular metal or plastic housing 75 of hollow tubular cross-section having rectangular openings 75a and 75b at opposite ends sized to accommodate a middle section 77 of an elongated metal tongue 78 having deflectable fingers 79 at the outer end portion. When the fingers 79 are pinched together toward a central slot 80 they can pass through the openings 75a and 75b of the housing. At an opposite end portion, the tongue 78 has an enlarged collar portion 81 which acts as a stop to limit further insertion of the tongue into the housing and which is permanently attached to the tether 60A which is looped through a slot therein.

Outer, oppositely facing edges of the fingers 79 of the tongue 78 act as cam surfaces which engage opposite edges of the entrance opening 75a of the housing 75 as the tongue is initially inserted to cam the fingers together toward the central slot 80. When full insertion of the tongue 78 in the housing 75 is accomplished, inner stop portions 79a at the base of each finger 79, engage the housing 75 outside the end of the opening 75b to lock the tongue 78 in place in the housing and thus securely connect the tether 60A to the cover 40 in a detachable connection.

When it is desired to disconnect the tether 60A and the cover 40, the fingers 79 are pinched together toward the center slot 80 while a pulling force is exerted on the tether 60A to withdraw the tongue 78 from the housing 75. The housings 75 are permanently attached to the stiffening bar 66 and the bottom wall of the housing 64 by means of fasteners such as rivets or bolts (not shown) which pass through aligned openings in the stiffening bar, housing wall and bottom wall of the connector housing 75.

Figure 8:
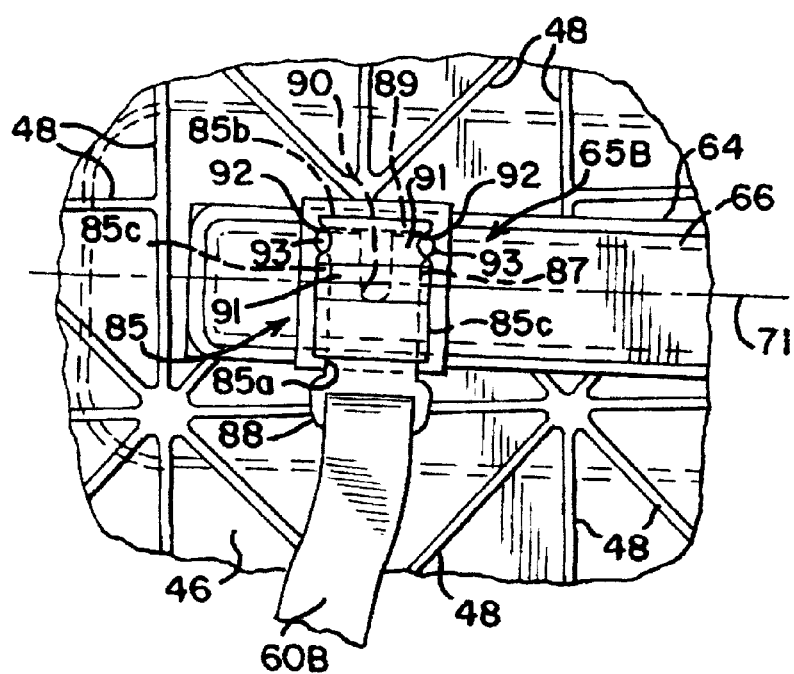
FIG. 8 is a view of a portion of the underside of a tether and cover combination utilizing yet another embodiment of a detachable connector therebetween.

Referring now to FIG. 8, therein is illustrated yet another alternate embodiment of a detachable connector 65B for use with a tether 60B such as a "seat belt" type webbing common to autos and airplanes. The connector 65B includes a generally rectangular, metal or plastic housing 85 of hollow tubular, generally rectangular cross-section having a rectangular entrance opening 85a at one end sized to accommodate a middle section 87 of a tongue 88.

The tongue 88 is generally similar both in structure and function to the tongue 78 of the prior embodiment except that an outer free end 89 of the tongue does not project outside of the housing 85 which is closed by an end wall 85b opposite the entrance opening 85a. The outer end portion of the tongue 88 is formed with a central slot 90 forming deflectable fingers 91 which are pinched toward the slot 90 by facing inside, opposite side edge walls 85c of the rectangular housing 85 as the tongue is inserted.

The opposite side edge walls 85c have open slots 92 at their ends adjacent the housing end wall 85b, in order to accommodate rounded outer cam elements 93 on the outer edge of the fingers 91 which extend into the slots 92 to lock and hold the tongue 88 in place in a detachable connection within the housing 85. For release of the tongue 88 to disconnect the tether 60B and the panel 40, the rounded cam elements 93 are pinched toward the center slot 90 while a pull out force is exerted on the tongue from the tether 60B. As this occurs, the cam elements 93 on the fingers 91 pass along the inside surfaces of the opposite side edge walls 85c of the housing 85 until the tongue 88 is clear. Insertion of the tongue 88 to interconnect or reconnect the tether 60B and the cover 40 is accomplished simply by inserting and pushing the tongue 88 inwardly into the housing 85 through the entrance opening 85a until the cam elements 93 reach the side edge wall slots 92 permitting the fingers 91 to spring apart to lock the tongue in place.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. An airbag system for motor vehicles having a panel formed with an opening in the vicinity of an occupant's seat, and including an inflatable airbag and housing for holding said airbag while in a deflated condition, said housing having an open end aligned with said panel opening to permit said airbag to pass outwardly when deployed to provide cushioning support for an occupant of said seat, comprising:

cover means closing said panel opening for protecting said airbag and movable to uncover said opening during airbag deployment;

flexible tether means, including an elongated flexible member, interconnected between said cover means and at least one of said panel and said housing for limiting the movement of said cover means away from said panel during airbag deployment;

attachment means connecting said tether means and said cover means releasable for permitting removal or replacement of said cover means without disturbance of the connection of said tether to said at least one of said panel and said housing;

said attachment means comprising detachably interconnectable male and female connector elements, one of said elements fixedly attached to said tether means and the other of said elements fixedly attached to said cover means.

2. The airbag system of claim 1, wherein:
said male connector element includes a plurality of elongated fingers having free outer ends, at least one free outer end deflectable toward another and, when so deflected, slidable longitudinally in said female connector element to interconnect said tether means and said cover means.

3. The airbag system of claim 1, wherein:
said tether means comprises a webbing of woven material having an end portion looped around one of said connector elements.

4. The airbag system of claim 3, wherein:
said end portion of said tether means is looped around said male connector element.

5. The airbag system of claim 3, wherein:
said male connector element includes a plurality of elongated fingers having free outer ends, at least one free outer end deflectable toward another and slidable longitudinally when so deflected in said female connector element to interconnect said tether means and said cover means.

6. The airbag system of claim 5, wherein:
at least one of said elongated fingers has retainer means adjacent said free outer end for securing said finger against longitudinal retraction from said female connector when released from deflection.

7. The airbag system of claim 1, wherein:
said tether means comprises cable means formed of strand elements wound together.

8. A tethered cover, for use with an airbag system for motor vehicles having a panel formed with an opening in the vicinity of an occupant's seat and a housing for an inflatable airbag aligned with said opening to permit said airbag to pass through said opening when it is deployed, comprising:

cover means closing said opening in said panel for protecting said airbag and movable to uncover said opening during airbag deployment;

flexible tether means, including an elongated flexible member, capable of detachably interconnecting said cover means and at least one of said panel and said housing for limiting the movement of said cover means away from said panel during airbag deployment; and releasable attachment means connecting said tether means and said cover means and releasable to permit disconnection and reconnection of said cover means and said tether means;

said attachment means comprising detachably interconnectable male and female connectors, said male connector being longitudinally slidable in said female connector to a position at which it forms a connection with said female connector, one of said connectors fixedly attached to said tether means and the other of said connectors fixedly attached to said cover means.

9. The tethered cover of claim 8, wherein:
said male connector includes a plurality of spaced apart opposite elongated fingers having free outer ends, at least one free outer end of a finger deflectable laterally toward an opposite finger, said male connector when so deflected slidable longitudinally of said fingers to fit in said female connector to interconnect said tether means and said cover means.

10. The tethered cover of claim 8, wherein:
said tether means comprises cable means formed of a plurality of strand elements.

11. The tethered cover of claim 8, wherein:
said tether means comprises a webbing of woven stranded plastic material having an end portion looped around one of said connectors.

12. The tethered cover of claim 11, wherein:
said end portion of said tether means is looped around said male connector.

13. The (airbag system) tethered cover of claim 11, wherein:
said male connector includes a plurality of spaced apart opposite elongated fingers having free outer ends, at least one free outer end of a finger deflectable laterally toward an opposite finger, said male connector when so deflected slidable longitudinally of said fingers fit in said female connector to interconnect said tether means and said cover means.

14. The tethered cover of claim 13, wherein:
at least one of said elongated fingers has cam means adjacent said free outer end for securing said finger against longitudinal retraction from said female connector after release from said lateral deflection.

* * * * *